United States Patent [19]

Slater

[11] 4,296,788

[45] Oct. 27, 1981

[54] CARRYING DEVICE

[76] Inventor: Peter G. Slater, 9 Ganung Dr., Ossining, N.Y. 10562

[21] Appl. No.: 158,150

[22] Filed: Jun. 10, 1980

[51] Int. Cl.³ .................. B65B 11/00; B65D 65/02; B65N 81/00
[52] U.S. Cl. .................................. 150/52 R; 150/3
[58] Field of Search .................. 150/3, 11, 52 R; 224/45 E, 45 P

[56] References Cited

U.S. PATENT DOCUMENTS 3,249,140  5/1966  Jackson .................. 150/52 R
4,058,956  11/1977  Skonieczny .............. 150/52 R X

*Primary Examiner*—George T. Hall
*Attorney, Agent, or Firm*—Curtis, Morris & Safford

[57] ABSTRACT

A device for carting leaves, grass clippings and the like is provided. It consists of a sheet member with a rigid member and supporting elements on at least one elongated side to which an attachment element may be connected to enclose the load of material to be disposed of.

5 Claims, 5 Drawing Figures

CARRYING DEVICE

This invention relates to a device for carrying loose materials such as leaves, grass clippings and other waste materials.

BACKGROUND OF THE INVENTION

The carting of waste materials which are the result of care or cleaning of a garden, lawn or similar area can be a problem. This is particularly so in those areas where there is a winter season. In the fall of each year some trees lose their leaves causing piles to accumulate about lawns and elsewhere. If these are not removed from lawns and are allowed to stay over the winter, and in many cases be covered with snow, the grass beneath the leaves will be severely damaged and sometimes caused to die. As a result, it is desirable to gather up leaves at the end of each fall season before winter comes with its cold and freezing weather and snow. The leaves must not only be gathered together in a pile and by some means suitably scooped up, but they also must be carried to a location which preferably is away from the area which has been cleaned.

Accordingly, it is an object of the present invention to provide a flexible and lightweight carrying device which permits leaves and similar materials to be piled on it, the device readily folded to enclose the contained material and then carried by means of an affixed supporting element to an area where the leaves or other materials may be dumped.

SUMMARY OF THE INVENTION

The carrying device of the present invention provides a sheet member, preferably of substantially rectangular shape to which an elongated substantially rigid member may be positioned along one side portion of the sheet. Advantageously the device has a second rigid member along the opposite side of the sheet for added support. However, it is well within the scope of the present invention to use one rigid member and the member need not extend the length of the sheet portion in order to be effective.

At each end of the sheet on the sides away from the rigid support members, attachment means are provided generally in the form of ring-like members attached to the sheet. These attachment members may be readily slipped over the end portions of the rigid members to enclose their ends and form an envelope so that the leaves or other materials contained therein will not fall out.

IN THE DRAWINGS

FIG. 1 is a side schematic view of the leaf carrier of the present invention showing the carrier formed together in the closed position to carry a load of material to be disposed of;

While only two illustrated embodiments of the present invention are shown others will be apparent to those skilled in the art and such other embodiments will come within the scope of the appended claims.

DESCRIPTION OF THE ILLUSTRATED EMBODIMENTS

Figure 1:
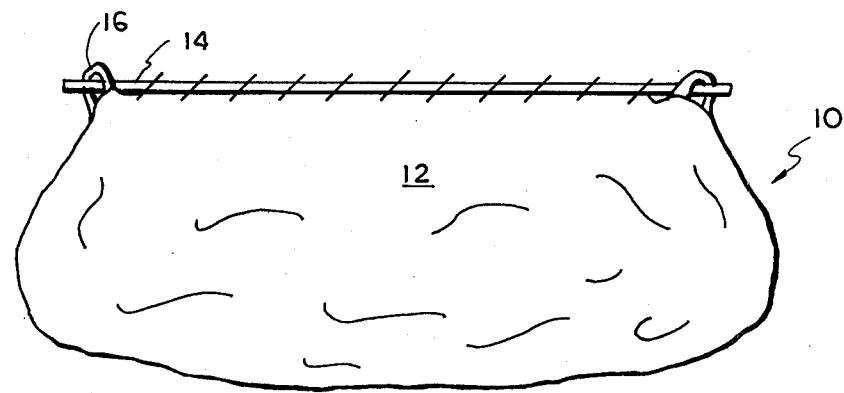
Figure 2:
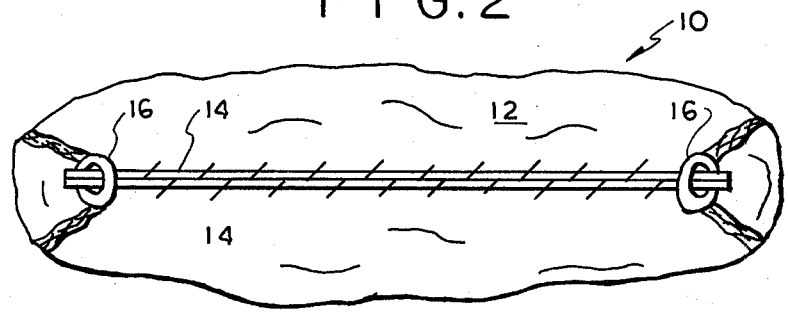
FIG. 2 is a top view of the closed carrier of FIG. 1.
Figure 3:
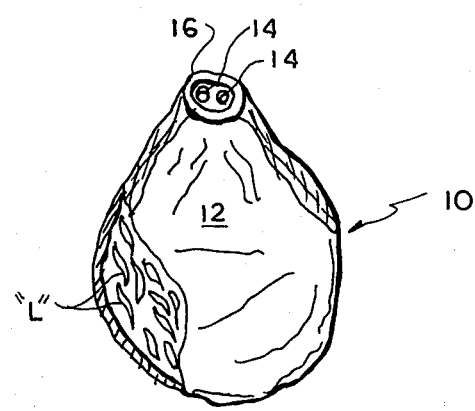
FIG. 3 is an end view of the carrier of FIGS. 1 and 2 with a partial cut-away section to show the contents of the leaves therein.

Referring to the drawings and to FIGS. 1 through 3 in particular, a carrier 10 in accordance with the present invention is shown. In FIGS. 1 through 3 the carrier is shown in its folded or closed position with a load of material to be disposed of "L" contained therein.

Figure 4:
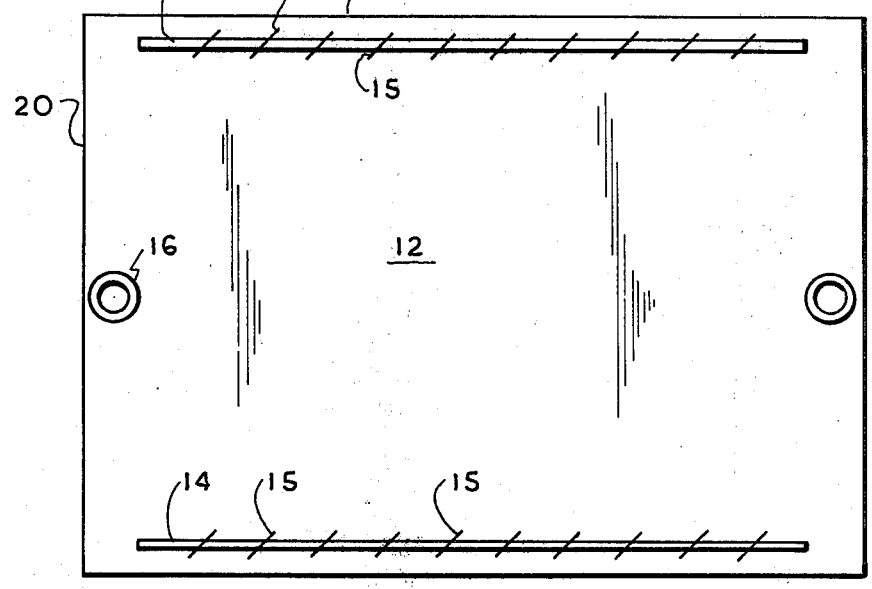
FIG. 4 is a plan view of a carrier of the type shown in FIG. 1 in an opened condition in preparation for receiving a load of leaves.

As shown in FIG. 4 the carrier 10 of FIGS. 1 through 3 is comprised of a flexible sheet 12 illustrated in rectangular shape in the drawings. The sheet may be of any suitable material such as plastic, woven fabric or the like. Preferably it is lightweight and yet sufficiently durable to carry a substantial load of material to be disposed of. A pair of rigid carrying members 14 are placed on the sheet 12 and inserted through supporting elements 15. In FIG. 4 the supporting elements are shown as loops of cord which are passed through openings in the sheet in the fashion of laces. Attachment means 16 in the form of loops are placed at the end portions of the sheet 12 midway between the rigid members 14. In the embodiment of FIG. 4 the rigid members and the supporting elements are placed along the longitudinal side 18 of sheet 12 while the attachment means 16 are placed in the end portions of the sheet 12 along the transverse side 20.

While a pair of rigid member 14 are shown in the embodiment of FIG. 4, it is to be understood that only one member need be used if desired and in that case the attachment means 16 would preferably be located along the transverse side 20 but adjacent to the longitudinal side 18 opposite the single rigid carrying member.

In order to place a load "L" to be disposed of in the carrier 10, the material is preferably positioned centrally on the sheet 12. The rigid members 14 are then drawn together and the attachment means 16 slipped over the adjacent ends of the members 14. When the carrier is in the closed position, it accepts a configuration such as shown in FIGS. 1 through 3.

Figure 5:
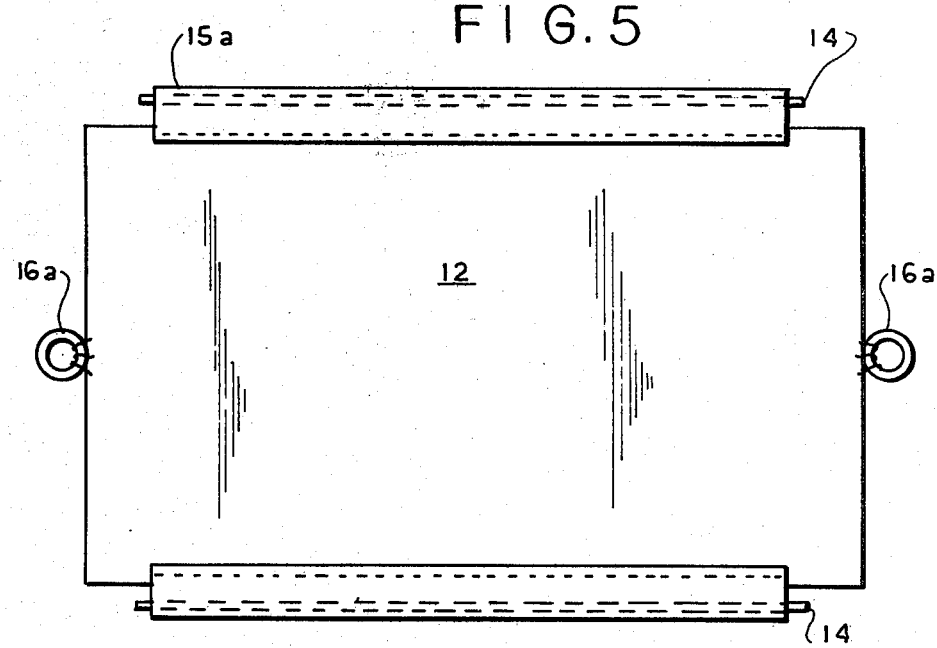
FIG. 5 is an alternate embodiment of the present invention similar to that shown in FIG. 4 with different support means for the rigid members.

Another embodiment of the carrier is shown in FIG. 5. In that embodiment the supporting elements 15 which were comprised of laces in the embodiment of FIG. 4, are replaced with a pair of sleeve members 15a which are affixed to the longitudinal sides 18 of the sheet 12. The attachment means 16 are replaced with loops 16a which may be in the form of rings attached to the sheet 12.

The embodiment of FIG. 5 when closed would function substantially the same as that of FIG. 4.

The substantially rigid members 14 may be made of any suitable material such as plastic or metal tubing or wood, which may deflect but does not break under the load "L".

In some cases it may be desired to limit the extent of the rigid members 14 so that the unit may be easily packed away when not in use. In such cases an added element in the form of an enlarged knob or hook portion may be affixed to the ends of the members 14 so that the attachment means 16 can be more readily connected thereto.

From the foregoing description of the present invention, it is submitted that a lightweight and simple carrier is provided in accordance with the objectives of the present invention.

What is claimed:
1. A flexible fabric carrier comprising:

(a) a sheet member of substantially rectangular shape,
(b) an elongated substantially rigid member adapted to be positioned along a first side portion of the sheet,
(c) supporting elements affixed to the sheet along said first side portion and adapted to receive the elongated rigid member, and
(d) attachment means at each of the end portions of the sheet not opposite said first side portion, whereby said attachment means may be connected to the elongated rigid member so that any material placed on the sheet will be contained by the folded sheet formed by the connection of the attachment means to the rigid member.

2. A flexible fabric carrier as defined in claim 1 and further including a second rigid member received in supporting elements affixed to a second side portion of the sheet member opposite the first side portion and wherein said second rigid member is also adapted to be connected to the attachment means.

3. A flexible fabric carrier as defined in claim 2 wherein the attachment means comprises open ring-like members attached to the sheet member and positioned substantially intermediate between the first and second side portions.

4. A flexible fabric carrier as defined in claim 2 wherein the supporting elements comprise a plurality of loops affixed to the sheet and extending along a substantial extent of the first and second side portions.

5. A flexible fabric carrier as defined in claim 2 wherein the supporting elements comprises a portion of the sheet member folded upon itself along a substantial extent of the first and second side portions and attached thereto to form sleeves for receiving the rigid members.

* * * * *